(12) United States Patent
Brillhart et al.

(10) Patent No.: US 7,796,039 B2
(45) Date of Patent: Sep. 14, 2010

(54) QUICK AND ACCURATE DETECTION AND REPORTING OF COMPONENT FAILURES USING RFID

(75) Inventors: David Clark Brillhart, Orlando, FL (US); Christopher James Dawson, Arlington, VA (US); Michael David Kendzierski, New York, NY (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 11/769,918

(22) Filed: Jun. 28, 2007

(65) Prior Publication Data

US 2009/0002164 A1    Jan. 1, 2009

(51) Int. Cl.
*G08B 13/14* (2006.01)
(52) U.S. Cl. .............. 340/572.1; 340/635; 714/57; 714/48; 714/E11.188; 702/185
(58) Field of Classification Search ........... 340/572.1, 340/10.1, 10.5, 10.51, 635; 714/57, 48, E11.188; 702/185
See application file for complete search history.

(56) References Cited

U.S. PATENT DOCUMENTS

| | | | |
|---|---|---|---|
| 6,581,449 B1 * | 6/2003 | Brown et al. | 73/146 |
| 6,806,808 B1 | 10/2004 | Watters et al. | |
| 7,004,019 B2 * | 2/2006 | Fischer et al. | 73/146 |
| 7,167,078 B2 | 1/2007 | Pourchat | |
| 2001/0004236 A1 * | 6/2001 | Letkomiller et al. | 340/572.1 |
| 2005/0231365 A1 | 10/2005 | Tester et al. | |
| 2006/0212096 A1 | 9/2006 | Stevenson | |

OTHER PUBLICATIONS

Shiva Chetan, Anand Ranganathan, Campbell, R., "Towards Fault Tolerance Pervasive Computing", Technology and Society Magazine, IEEE, downloaded from http://ieeexplore.ieee.org/xpl/freeabs_alljsp?isnumber+30520&arnumb... on Apr. 19, 2007.

RFID Journal, Boeing's RFID Paln: The Sky's the Limit, downloaded from http://www.rfidjournal.com/article/articleprint/2921/-1/392&RFID+tag+... on Apr. 19, 2007.

* cited by examiner

*Primary Examiner*—George A Bugg
*Assistant Examiner*—Hongmin Fan
(74) *Attorney, Agent, or Firm*—Robert H. Frantz; David A Mims, Jr.; John R. Pivnichny

(57) ABSTRACT

Component failures are reported using a radio-frequency identification tag associated with an electronic component of a computer system installed on a common communications bus and power bus among at least one other electronic component wherein failure of a component may cause disruption of the power bus, the communications bus, or both busses; a system-level diagnostic function within the computer system but external to the first electronic component receiving a diagnostic failure indication from the first electronic component, and responsive to receipt of the diagnostic failure indication, sending a latching signal to the first electronic component; and a latch controllable by the latching signal, the latch having at least two stable modes including an unlatched mode which prevents the tag from transmitting signals upon query by a radio-frequency identification reader, and a latched mode which enables the tag to transmit signals upon query by a radio-frequency identification reader.

16 Claims, 14 Drawing Sheets

QUICK AND ACCURATE DETECTION AND REPORTING OF COMPONENT FAILURES USING RFID

BACKGROUND OF THE INVENTION

1. Field of the Invention

The present invention relates generally to systems and tools for diagnosis and isolation of failed components in complex systems.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

Component failures in complex systems are difficult to isolate, particularly in a situation where a catastrophic or cascading failure has occurred. When a computer system component fails, the failure may present itself to the end user in various ways, where often the perceived result of the failure is not indicative of the actual component that has failed.

For example, if a network adapter fails in a computer such that network communication is no longer possible, the adapter will become an immediate candidate for testing and replacement. If, on the other hand, the network adapter fails in such a way that the failure causes a short-circuit on the system-bus and induces a system power failure, the observed symptom of a network adapter failure is not readily related back to the failed component—it may be initially diagnosed as a power supply or backplane failure. Thus, a failed network adapter in this manner would hide the true failure that caused the outage. Additionally, as long as such a short-circuit on the network adapter exists, it would not be possible to successfully apply power and boot the system.

Using conventional troubleshooting techniques in this example scenario, it is likely that the first component replaced in this case would be the power supply. When the replacement of the power supply failed to repair the system, the next likely components to be replaced would be the system board and backplane. Additionally, in such a system-wide failure expensive components such as system processors may become suspect.

To further exasperate a situation such as this, during troubleshooting, the non-suspect parts would typically remain in or be reinstalled in the system, and thus may cause further damage to existing and new system components installed. In such cases, much effort and expense may be exhausted on a problem that could have been repaired quickly and inexpensively if the failing component had been properly identified upon initial failure of the system.

Therefore, there is a need in the art for a system and method to report upon individual system components when a failure occurs, even in the case where power can no longer safely be applied to the system, independent of internal system capabilities, such as busses and power supplies.

SUMMARY OF THE INVENTION

Component failures are reported using a radio-frequency identification tag associated with a first electronic component of a computer system, the component being installed on a common communications bus and power bus among at least one other electronic component wherein failure of a component may cause disruption of the power bus, the communications bus, or both power and communications busses; a system-level diagnostic function within the computer system but external to the first electronic component configured receiving a diagnostic failure indication from the first electronic component, and responsive to receipt of the diagnostic failure indication, sending a latching signal to the first electronic component; and a latch controllable by the latching signal, the latch having at least two stable modes including an unlatched mode which prevents the tag from transmitting signals upon query by a radio-frequency identification reader, and a latched mode which enables the tag to transmit signals upon query by a radio-frequency identification reader.

BRIEF DESCRIPTION OF THE DRAWINGS

The following detailed description when taken in conjunction with the figures presented herein provide a complete disclosure of the invention.

DETAILED DESCRIPTION OF THE INVENTION

The inventors of the present invention have recognized problems previously unrecognized by others in the art of reporting and collecting component failure information in a complex system, especially where the failure mode may inhibit the overall system's ability to report or accurately diagnose the component-level fault.

Many applications for the present invention exist. For ease of understanding, however, examples in this disclosure will be based on computer systems and their associated components. It will be readily understood by those skilled in the art that the present invention may be applied to complex systems of a broad range, such as but not limited to aircraft, automobiles, space vehicles and systems, weapons systems, and smart appliances.

In general, to delineate a "component" from an integral system part, a component is a board, chip, module, or other structure which is designed or constructed intentionally for generalized repair through removal and replacement in a field setting. In some contexts, the term Field Replaceable Unit, or FRU, is utilized, to designate a "component" which is replaceable in a field setting as opposed to being replaceable in a factory or repair shop setting.

The present invention provides a system and method to enable rapid troubleshooting of failed components, such as computer components, using internal monitoring circuits within the computer system that employ a short-range, ubiquitous wireless transmission technology, such as Radio Frequency Identification ("RFID") technology, to report the failure data to a collection system. Throughout the present disclosure, RFID will be utilized as an example wireless technology, but it will also be understood by those skilled in the art that other suitable short-range wireless technologies, such as BlueTooth and Infrared Data Arrangement ("IrDA"), as well as proprietary wireless technologies, may be employed as well.

Illustrative Embodiment

In one embodiment, the present invention uses RFID technology within a computer system so that a failed component or functional area can be quickly identified as the primary cause of the failure, especially in failure modes which prohibit query of the component, communication by the component, or isolation of the component while still installed in the overall system.

Figure 5:
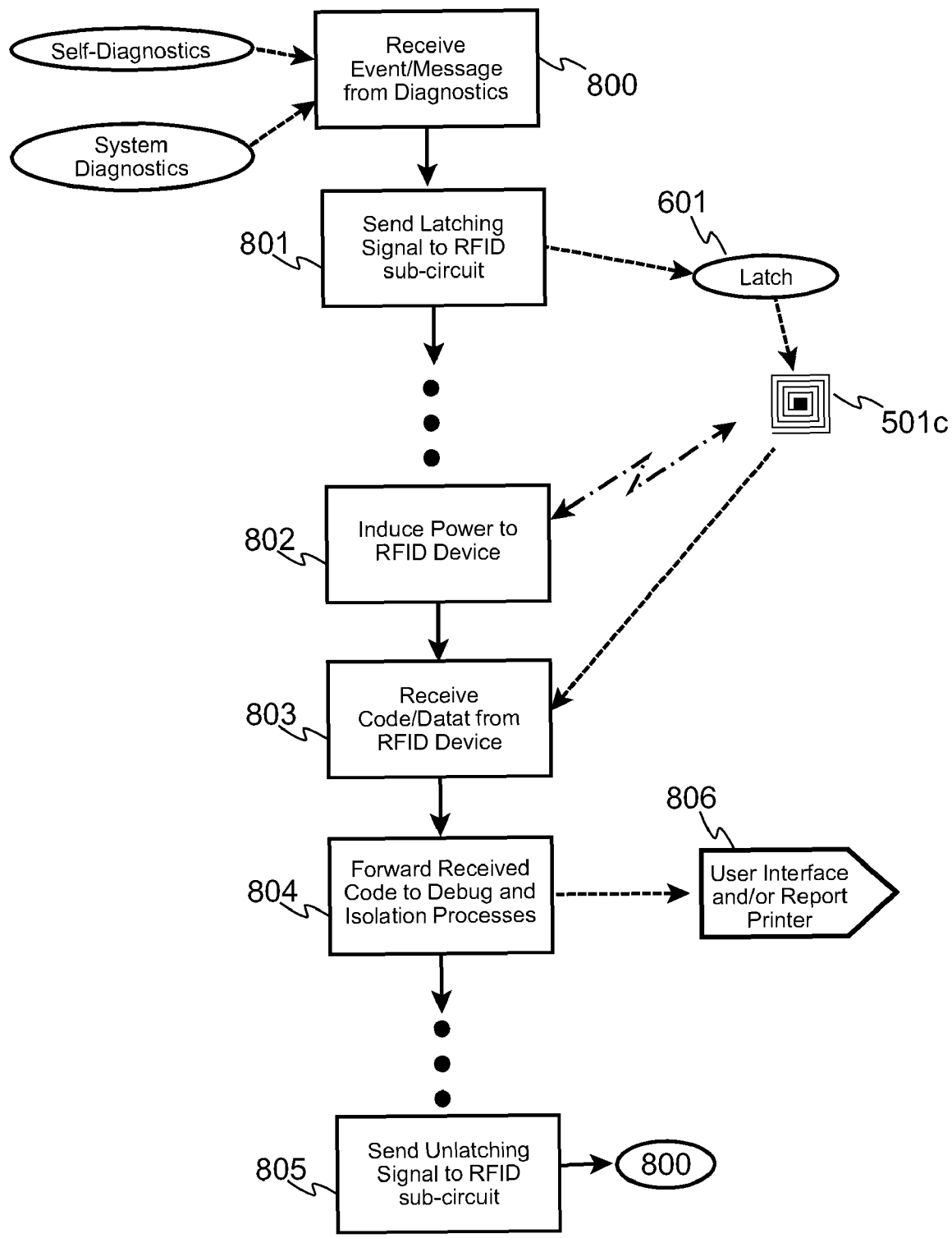
FIG. 5 illustrates a logical process according to the invention.

Turning to FIG. 5, a generalized example of a system (500) having a number N components (501, 502, . . . 503), in which some common circuits and services (506) interact or interface to several or all of the components. In a computer system for example, the components may be the power supply, the motherboard, disk drives, network interface cards ("NIC"), graphics accelerator cards, memory modules, etc. Certain common circuits and functions (506) usually exist, such as a data and address bus, a power bus, and clock distribution in a computer system.

The system (500) has certain system-level functions (504), such as an operating system and basic input/output services ("BIOS") in a computer system. The system may also have system-level diagnostics functions (505), potentially including special purpose circuitry (e.g. temperature sensors, voltage sensors, etc.), and special software (fault detection and isolation routines, data corruption routines, anti-virus modules, firewall software, etc.).

Each component also provides certain component functions (501a, 502a, . . . 503a), some of which may be implemented in circuitry, and some of which may be implemented in software or firmware. And, each component is also provided with self-diagnostic capabilities (501b, 502b, . . . 503b). Likewise, some of the self-diagnostic functions may be implemented in circuitry, and some may be implemented in software or firmware.

Modern computing systems and elements continuously run on-board diagnostics to determine system health and to record failures, often saving such failure data in an error log. In one embodiment, the self-diagnostic functions and the system diagnostic functions of an existing system, such as those of a computer system, are reused, preferably with modification to interface to the reporting circuit described in the following paragraphs.

Figure 1:
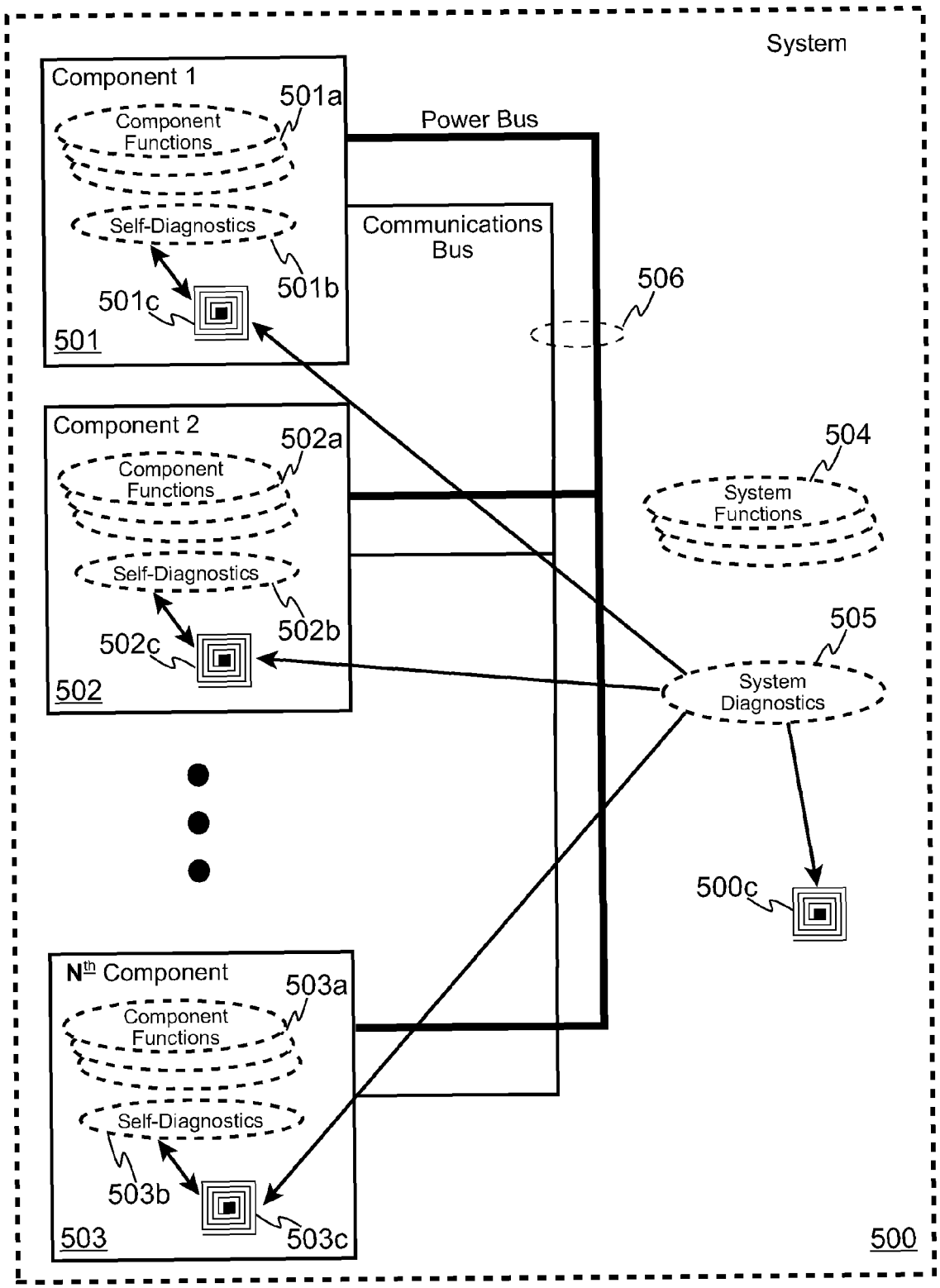
FIG. 1 sets forth a system diagram according to the invention.

As shown in FIG. 1, according to the invention, a short-range wireless memory and communications device, such as a passive RFID device, is added to each component (501c, 502c, . . . 503c), as well as to the system (500c). The RFID-equipped monitor coordinates with and interacts with existing built-in component-level and system-level diagnostic capabilities. Based on self-diagnostic detection of a failure or error condition, an RFID tag associated with the suspect component becomes active and "marks" the component or functional element as having failed or as being suspect. The RFID monitor circuit then uses a passive RFID tag, requiring no internal power source to maintain its memory state and record of the failure or diagnostic test results. Passive RFID tags are activated by the remote devices that read them. Such an embodiment is readily and inexpensively incorporated into a large variety of equipment.

Figure 6:
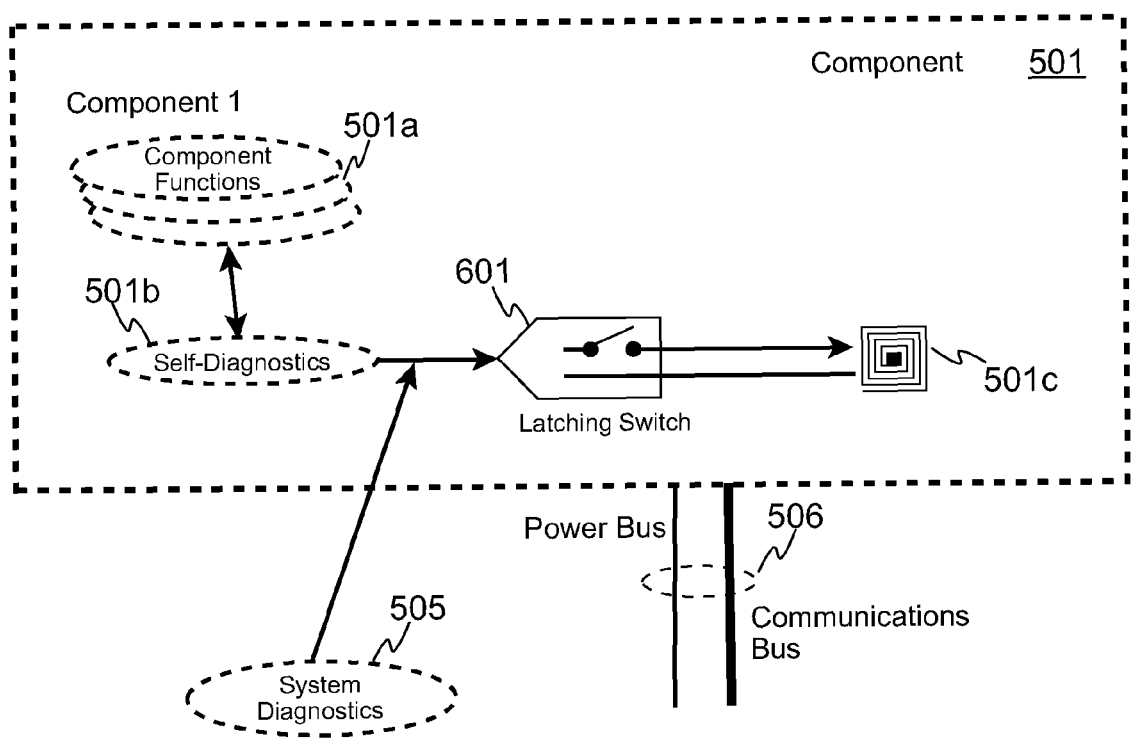
FIG. 6 depicts a component having a passive RFID "tag" device with a latching mechanism per the invention.

Turning to FIG. 6, one possible circuit configuration for the present invention is depicted. This illustration is a functional-level illustration, whereas it is within the skill of those in the art to implement a detailed circuit to accomplish these functions. In this arrangement, the component (501), such as a Peripheral Component Interconnect ("PCI") or Personal Computer Memory Card International Association ("PCMCIA" or "PC Card") card, is improved to including a short-range wireless communication device, preferably a passive RFID "tag" device (501c), interfaced and controlled by self-diagnostics (501b) functions through a latching switch (601) which retains it's setting even with power removed. Optionally, component-external diagnostics, such as system-level diagnostics (505), may be interfaced to the latching switch (601), as well.

In this manner, when a fault or error is detected by a diagnostic function, it is recorded in the non-volatile memory of the wireless memory and interface device (501c), and latched (601). Then, even when power is removed from the system or component, an appropriate reader, such as an RFID wand, can be used to collect the error event records from the device (501c).

It should be noted that the latching mechanism of the present invention prevents the transmission of the RFID memory contents when the latch is unlatched. In other words, the latch acts as an enablement/disablement device to the RFID transmitter. This way, in a minimal configuration, the RFID device will not respond to a reader or wand if the component has not detected a failure.

Figure 7:
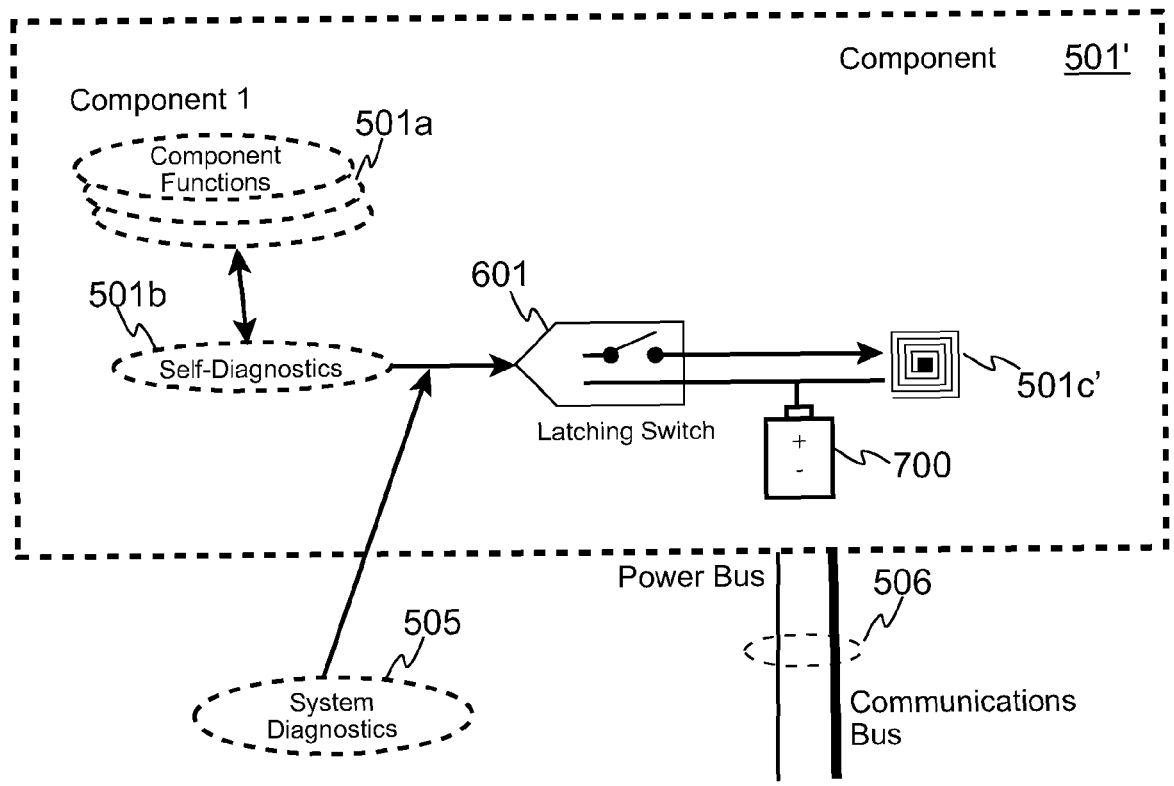
FIG. 7 depicts a component having an active RFID "tag" device with a latching mechanism in accordance with the invention.
Figure 8:
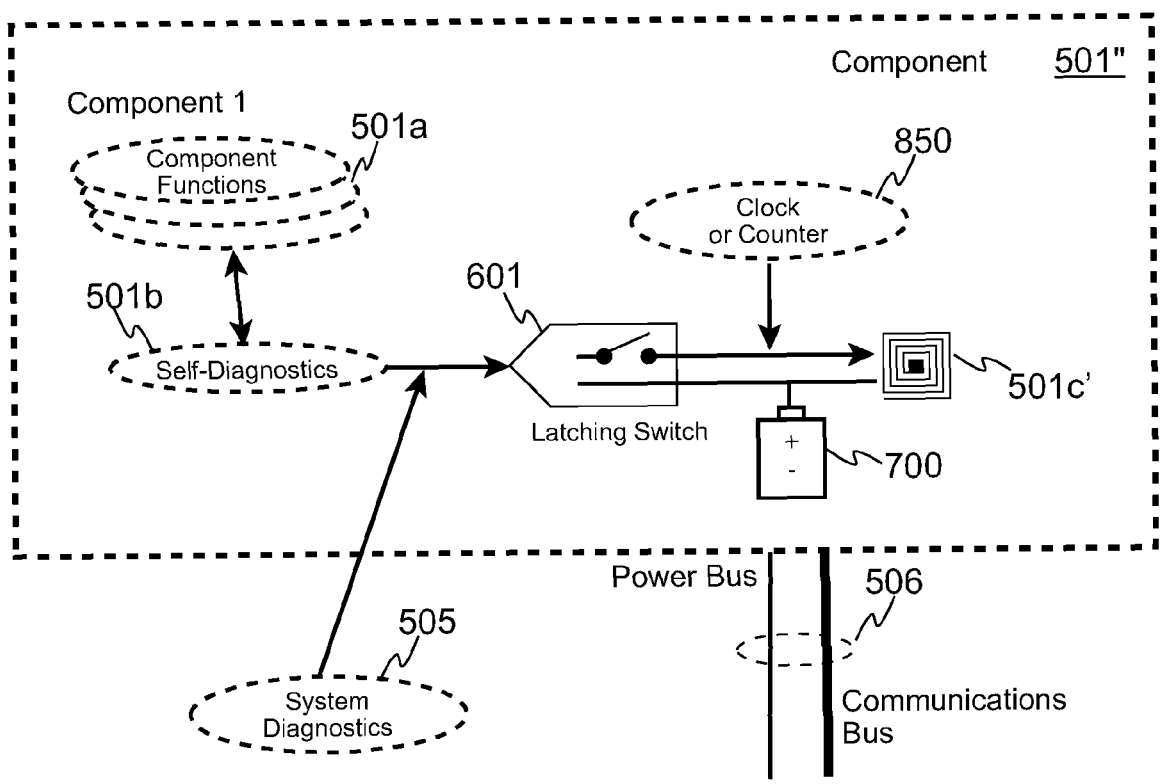
FIG. 8 depicts a component having an active RFID "tag" device with a latching mechanism and a clock or counter in accordance with the invention.

In an alternative embodiment, as illustrated in FIG. 7, a component (501') is provided with an active type of RFID device (501c'), which is provided power from the component or system (700) instead of or in supplement to power induced from an RFID reader. In this embodiment, a powered solid state circuit is used as the latch circuit and a power source is provided to the circuit. The advantages of such an embodiment, even though a small amount of cost is likely incurred, is that a wider range of possible latch circuits are available for use and circuit state is maintained by the internal power source. Additionally, given that the circuit remains opened during normal operation in the preferred embodiment and is active only when a failure has occurred, the life of the internal power source, such as a small battery, is greatly extended. An additional benefit of using a powered circuit is that active RFID devices could be used.

In yet another embodiment of a power-enabled RFID sub-circuit provided to a component (501"), a clock or counter (850) is provided to the RFID sub-circuit. While a small amount of cost is likely added, additional benefits are also derived. In such an embodiment, if multiple RFID circuits are activated after a failure, a time stamp or other counter is preferably included with the RFID tag data and codes to determine the order in which elements failed. As an example, in a computer system failure of a PCI based I/O component, the failure could be caused by the PCI-Bridge, up to four PCI-slots on the bridge, and the adapters in these slots. In such a case it would be helpful to understand the order in which failures were detected. As an example, after such a failure if the RFID reader found tags active for the PCI-Bridge, two PCI slots, and one PCI adapter, knowing the order in which these failures occurred makes diagnosing the problem easier. In this example, if the PCI-Bridge reported the first error, the other errors are likely cascading and caused by the failure of the bridge. If, on the other hand, an adapter were the first failing device, it is likely that it failed in such a way as to affect the bridge and other components.

Logical Process According to the Invention

Turning to FIG. 5, an example logical process according to the invention is shown. When the condition monitor determines that it's component has failed (800), a signal is sent (801) to the afore-mentioned latching device (600), which closes the circuit to activate the RFID tag for that component.

Later, even with power removed from the component or system or with typical communications to the component inoperative, an RFID wand or reader is used to induce power (802) to the RFID device, and to receive (803) the transmitted data and/or codes from the device (501c). The data or codes should include at least an identifier of the component, such as component model (e.g. graphics card ViewZip123), component manufacturer (e.g. IBM Corp.), and preferably serial number (e.g. SN2007-MAR1-XK2). Further, if the component is provided with the ability to write or store additional information, such as trouble code and/or installation location (e.g. slot number 3), this information can be received by the process, as well.

Alternatively, some RFID device contents can be modified by the RFID "reader" (e.g. literally making the "reader" a "reader/writer"). In such an embodiment using a "writeable" RFID device, the wand can download data to the RFID device during or after installation to store installation-specific information, such as installation location (e.g. slot number), installer's identification (e.g. technician's name or ID number), installation date, etc. This information can then be retrieved (803) during fault situations, as well.

Finally, this information is forwarded (804) to one or more debugging and isolation processes, such as a system level diagnostic tool, for further handling of the fault and determination of repair procedures, including printing or showing a notification to a user or administrator (806).

According to one embodiment of the invention, the latch (601) remains closed until reset (805) so that the RFID tag is in a closed circuit and can be read by an external device.

Thus, using this invention, equipment can be diagnosed even following a catastrophic failure through the RFID tag. As an example, if a component in the DC portion of the primary power supply failed, this failure would be detected, the latch circuit for this element would be closed, and the DC power supply RFID tag would become active. With this type of failure, since the machine can no longer be powered-on, error logs and testing can not occur. With the present invention, however, a technician could simply scan the device with an RFID reader which would read the enabled passive RFID tag and very rapidly determine that a power supply failure has occurred. Upon repair of the machine, in one embodiment the latch would be reset and the circuit would be reused, while in another embodiment the RFID tag could be replaced as a part of the repair.

Based on cost and other considerations such as failure rates, component type (e.g. discrete or embedded), likelihood of causing a cascading failure, and other such criteria, the disclosed embodiments of the RFID monitor invention could be used independently or in combination in a given piece of equipment.

Suitable Computing Platform

In one embodiment of the invention, the functionality including the previously described logical processes are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Therefore, it is useful to review a generalized architecture of a computing platform which may span the range of implementation, from a high-end web or enterprise server platform, to a personal computer, to a portable PDA or web-enabled wireless phone.

Figure 2A:
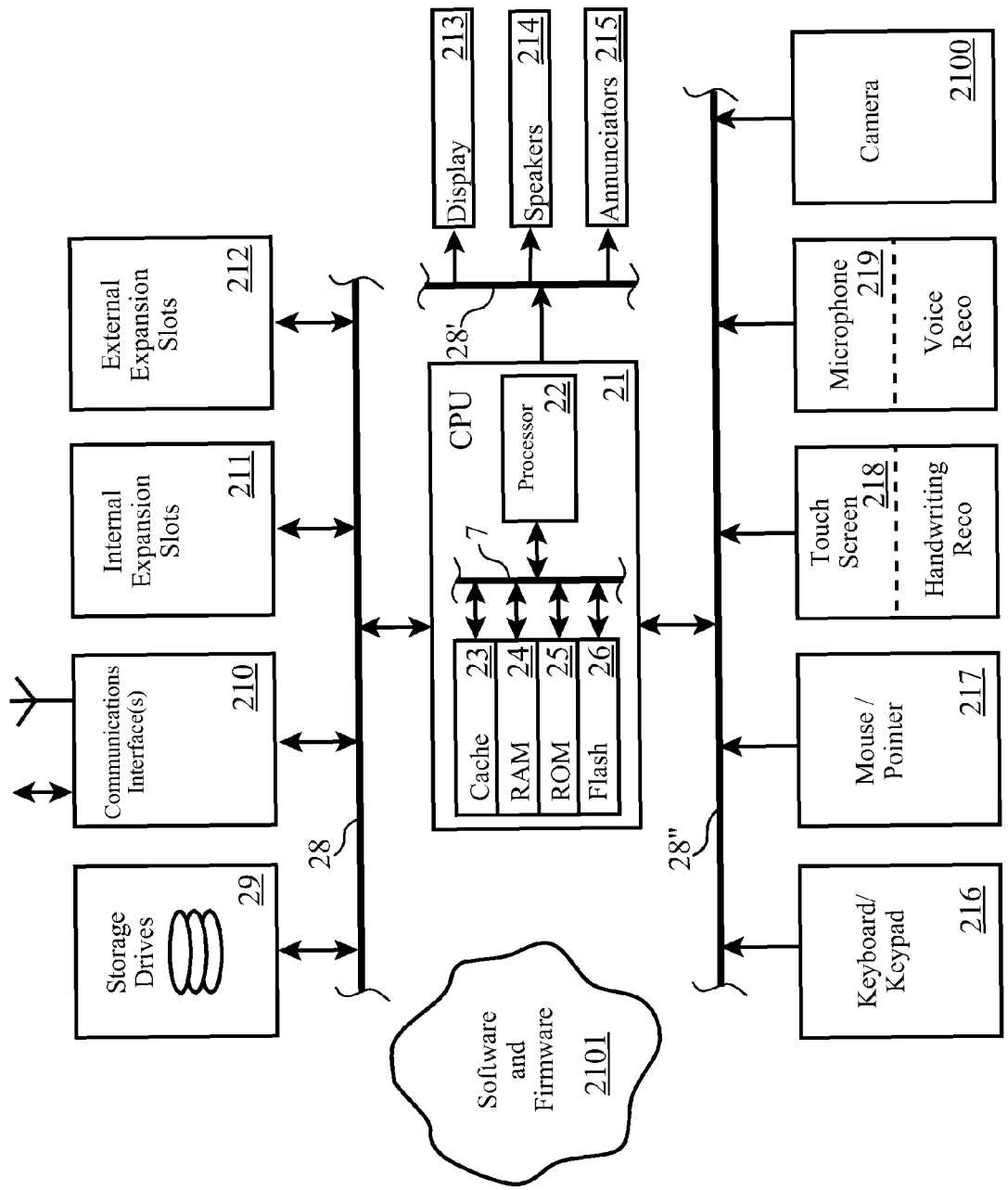
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Tomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
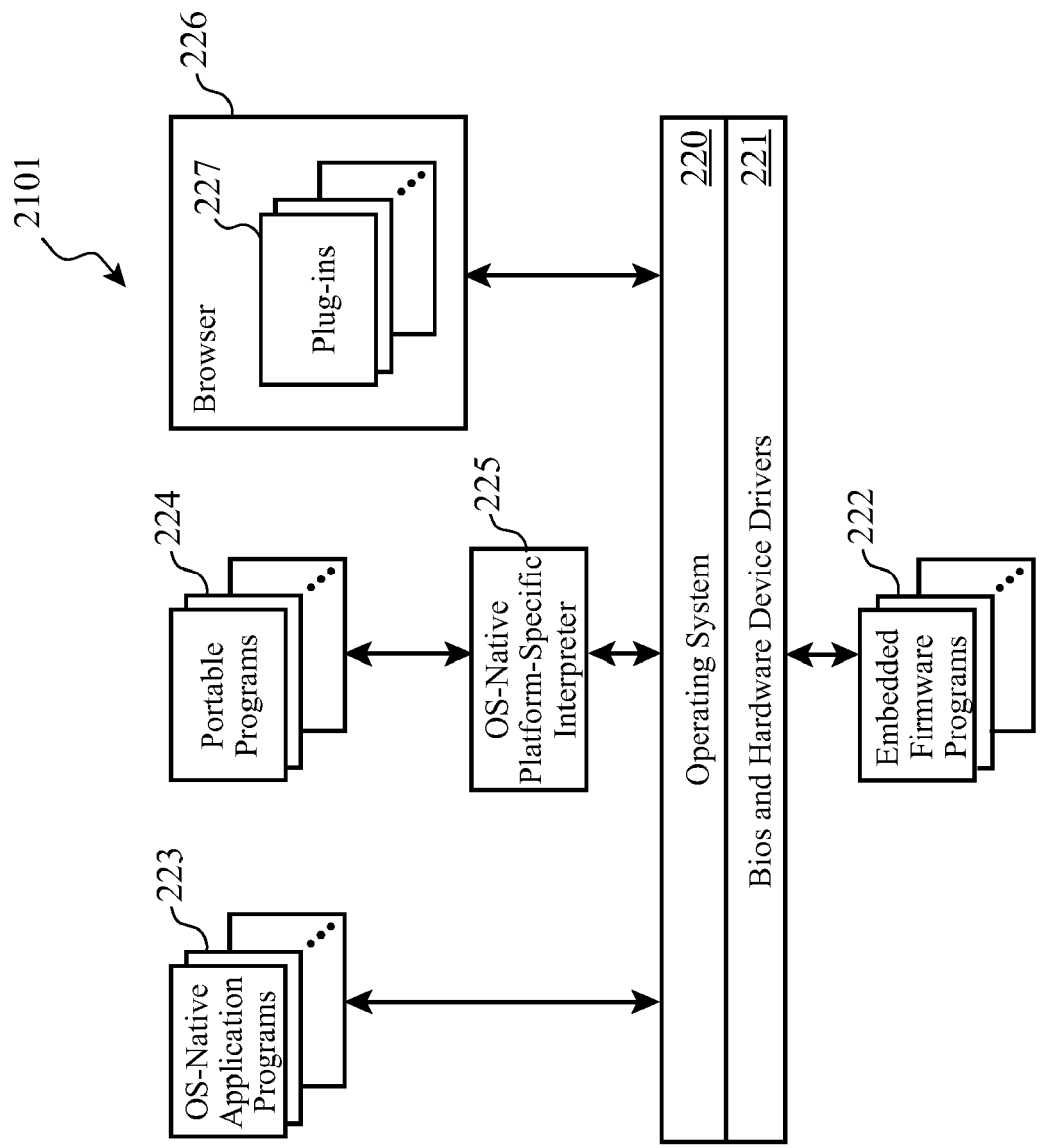

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-Based Embodiments

Alternative embodiments of the present invention include some or all of the foregoing logical processes and functions of the invention being provided by configuring software, deploying software, downloading software, distributing software, or remotely serving clients in an on demand environment.

Software Deployment Embodiment. According to one embodiment of the invention, the methods and processes of the invention are distributed or deployed as a service by a service provider to a client's computing system(s).

Figure 3A:
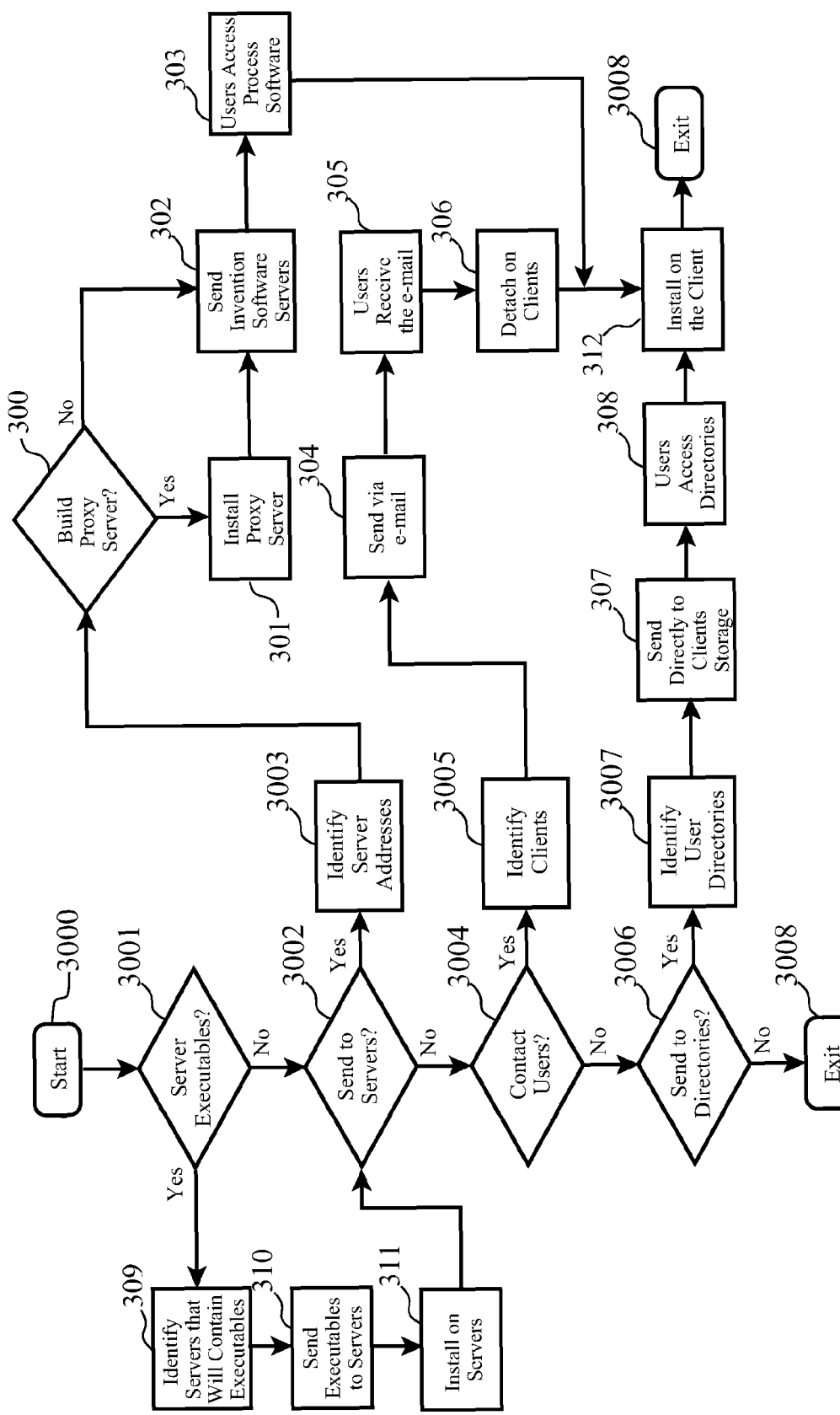
FIG. 3a sets forth a logical process to deploy software to a client in which the deployed software embodies the methods and processes of the present and related inventions.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
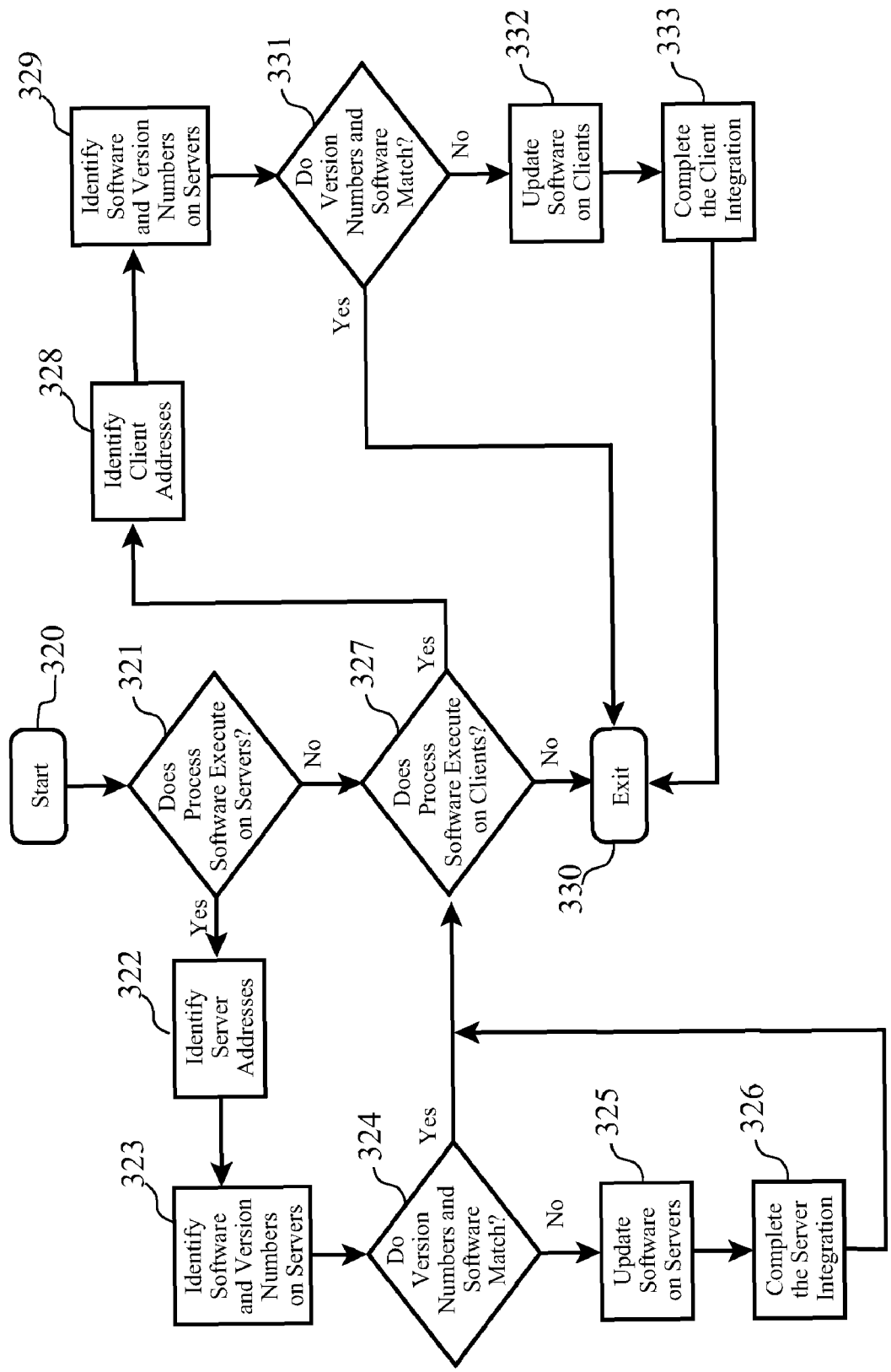
FIG. 3b sets forth a logical process to integrate software to other software programs in which the integrated software embodies the methods and processes of the present and related inventions.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match, then processing continues (327). Otherwise, if one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on demand computing architecture to render service to a client by a service provider.

Figure 3C:
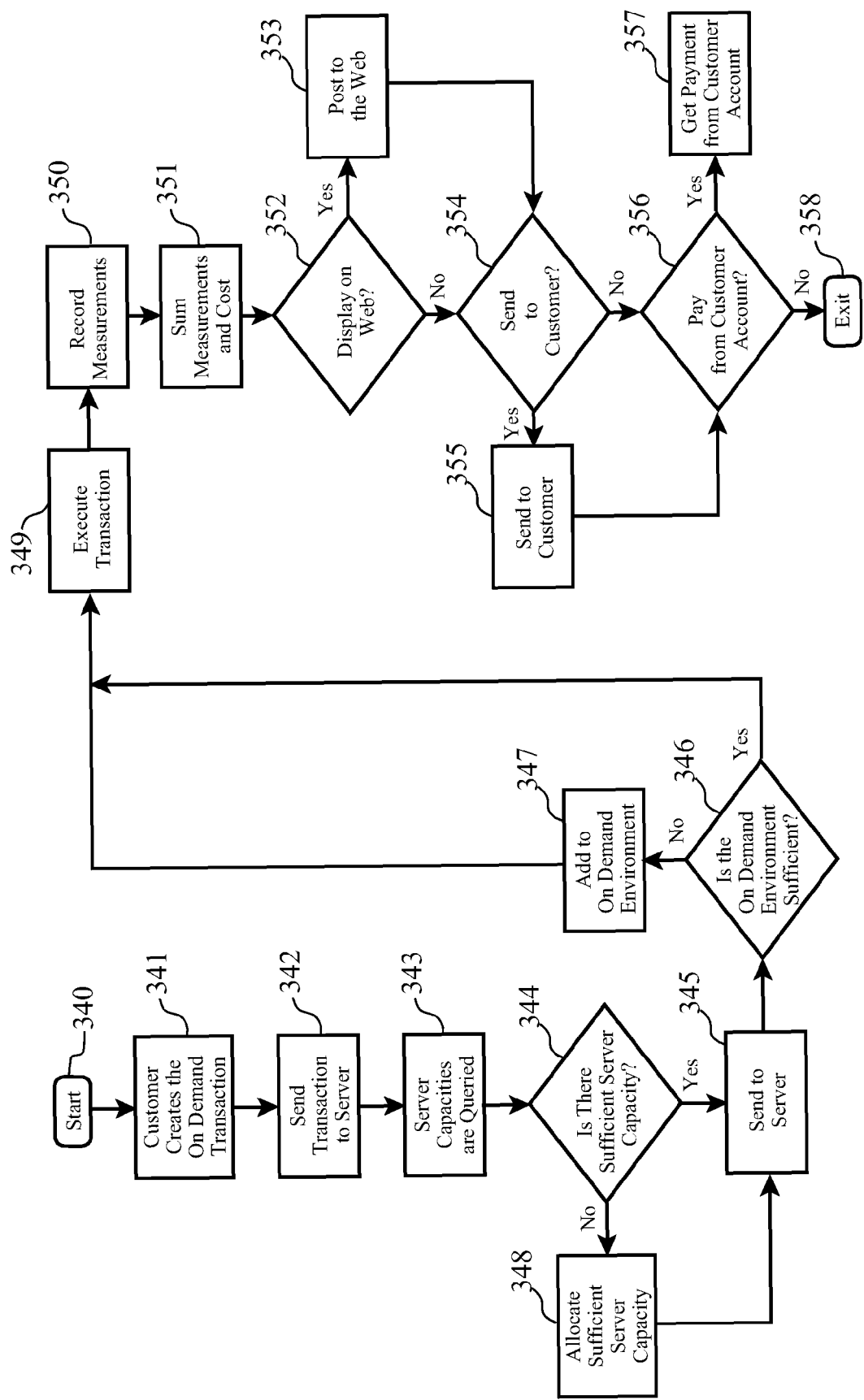
FIG. 3c sets forth a logical process to execute software on behalf of a client in an on-demand computing system, in which the executed software embodies the methods and processes of the present and related inventions.

Turning to FIG. 3c, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment. According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
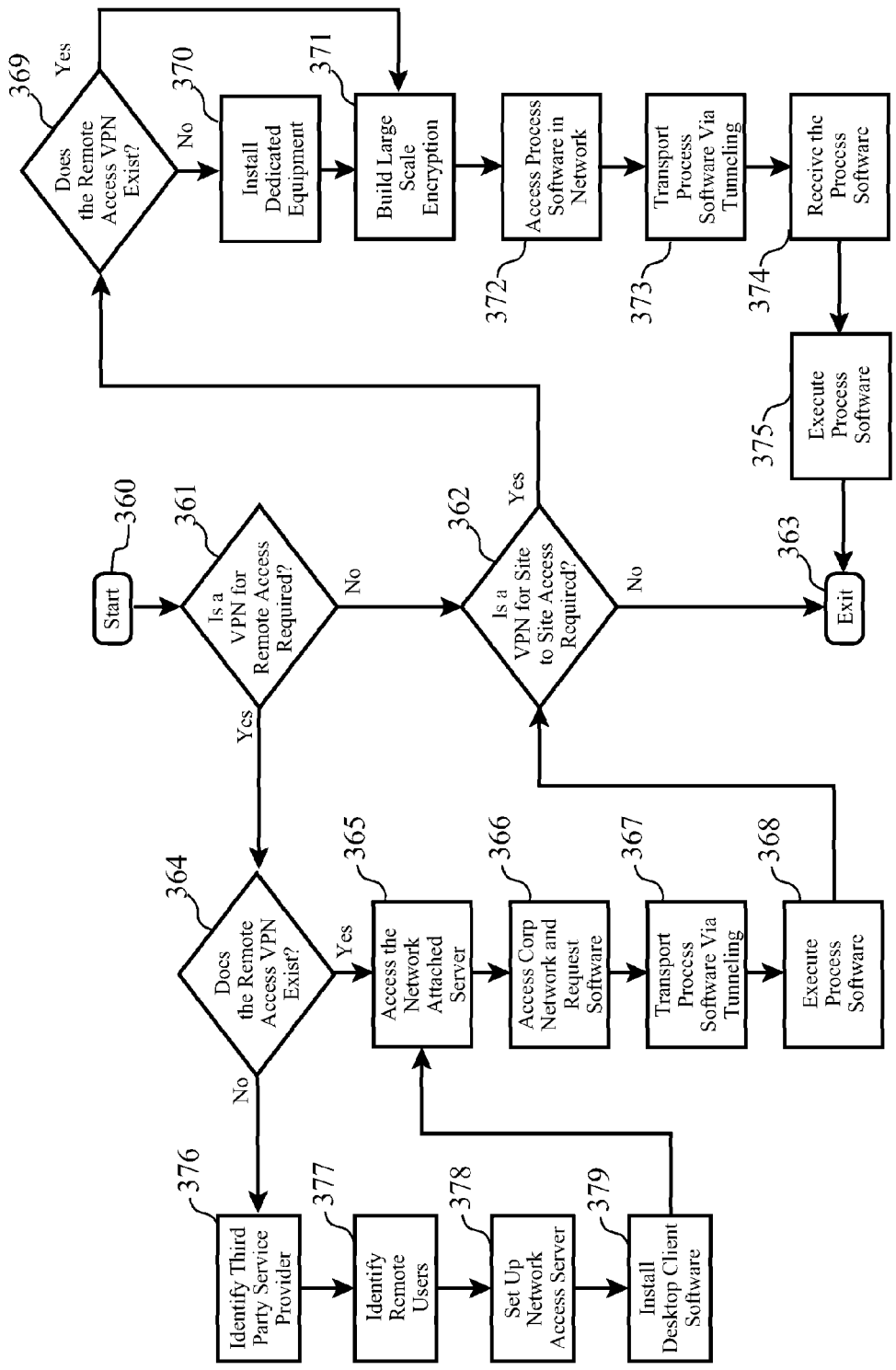
FIG. 3d sets forth a logical process to deploy software to a client via a virtual private network, in which the deployed software embodies the methods and processes of the present and related inventions.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
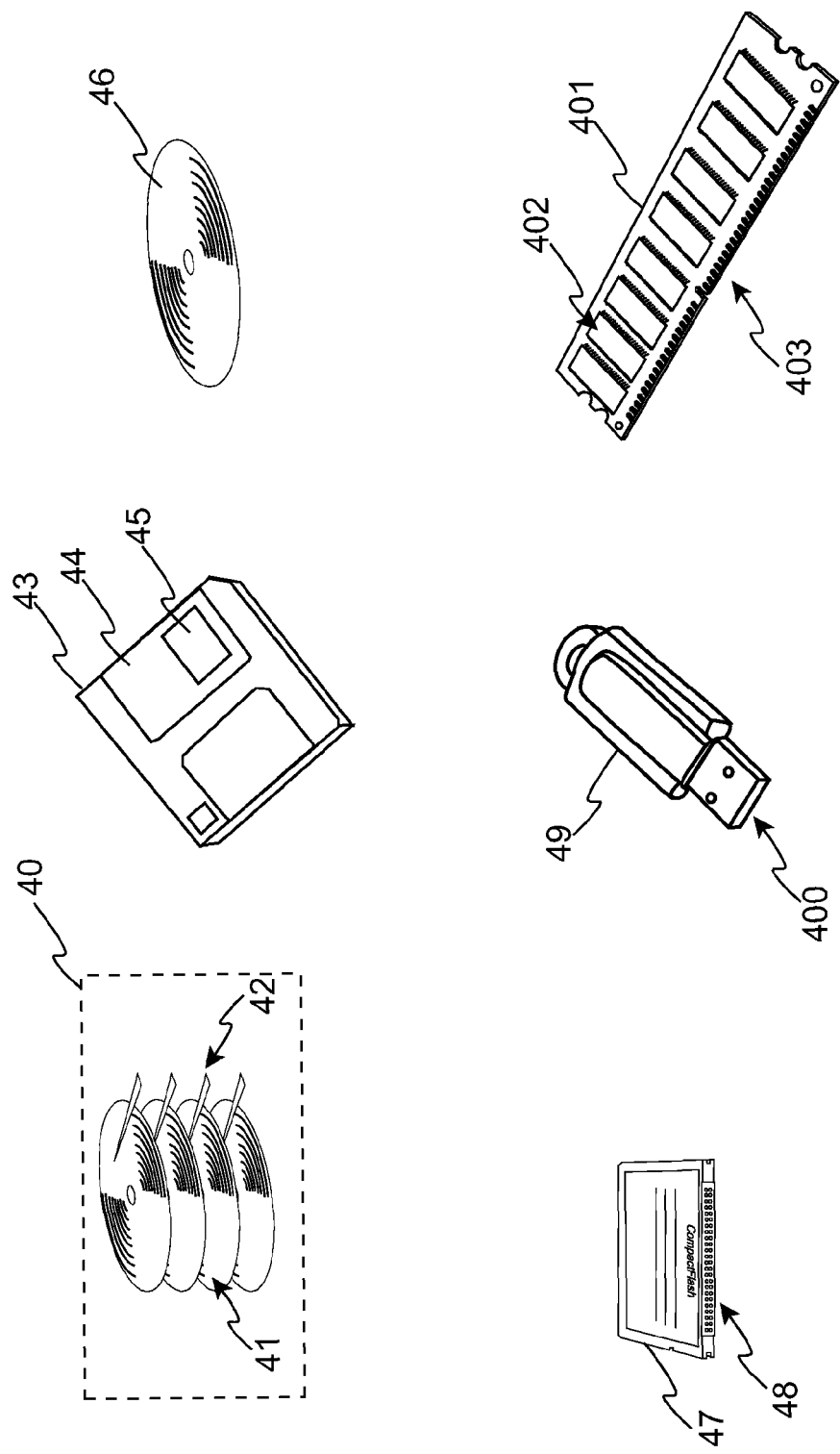
FIGS. 4a, 4b and 4c, illustrate computer readable media of various removable and fixed types, signal transceivers, and parallel-to-serial-to-parallel signal circuits.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
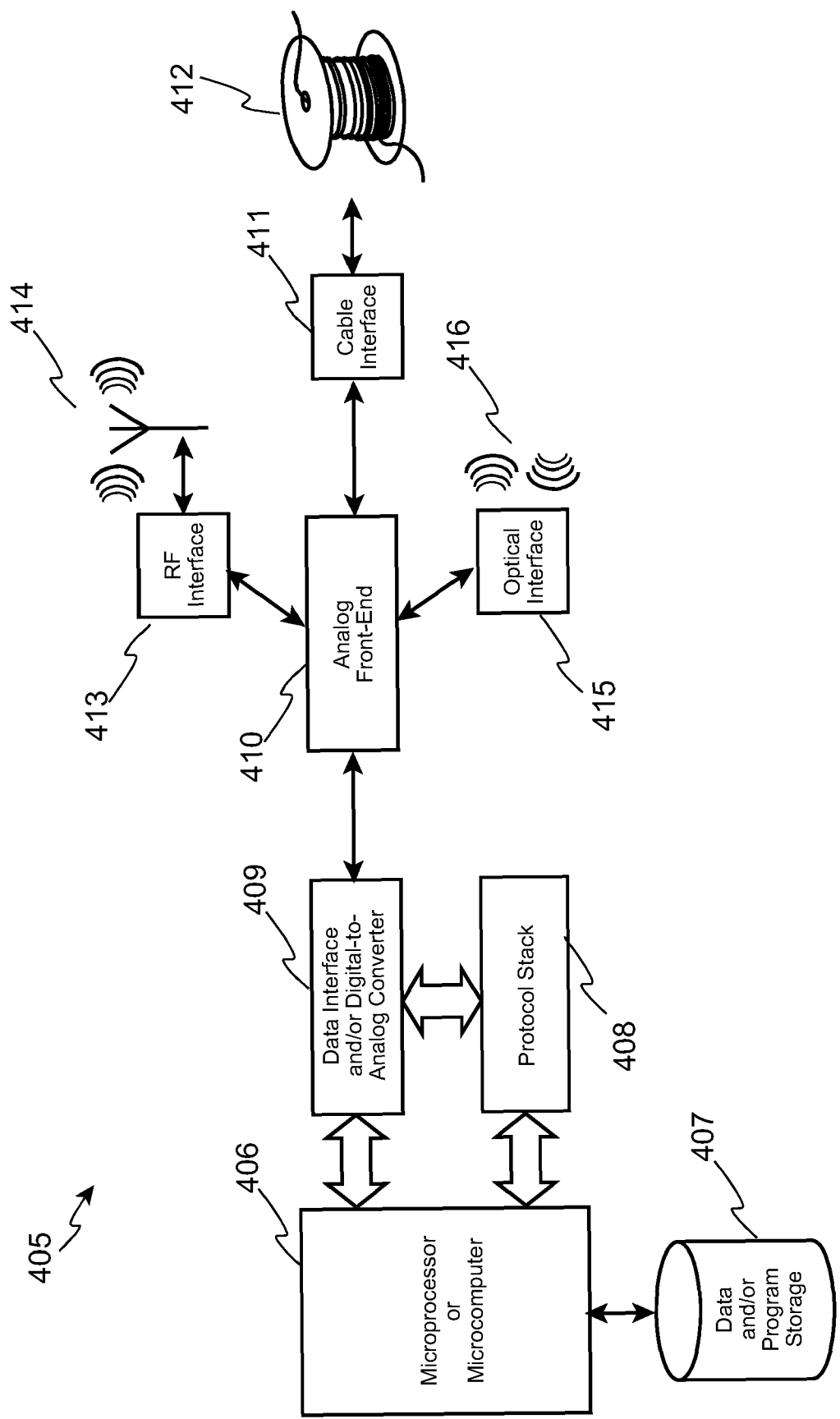

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
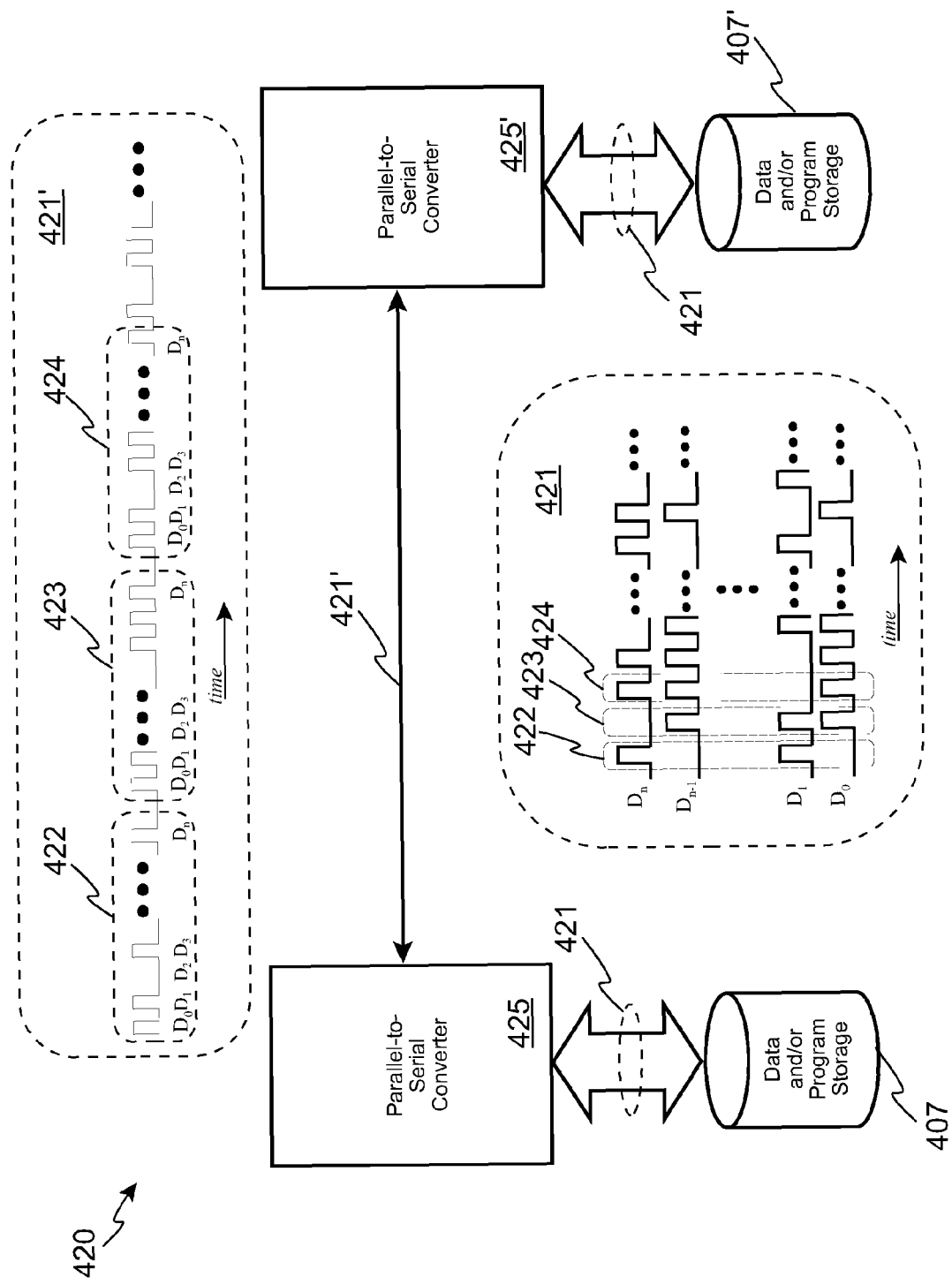

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

CONCLUSION

While certain examples and details of a preferred embodiment have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. An apparatus comprising:
   a radio-frequency identification tag associated with a first electronic component of a computer system, the component being installed on a common communications bus and power bus among at least one other electronic component wherein failure of a component may cause disruption of the power bus, the communications bus, or both power and communications busses;

a system-level diagnostic function within the computer system but external to the first electronic component configured to receive a diagnostic failure indication from the first electronic component, and responsive to receipt of the diagnostic failure indication, to send a latching signal to the first electronic component; and a latch controllable by the latching signal, the latch having at least two stable modes including an unlatched mode which prevents the tag from transmitting signals upon query by a radio-frequency identification reader, and a latched mode which enables the tag to transmit signals upon query by a radio-frequency identification reader.

2. The apparatus as set forth in claim 1 wherein the unlatched mode of the latch is a default mode of operation.

3. The apparatus as set forth in claim 1 wherein the latch is transitioned to the latched mode by the diagnostic function responsive to detection of a failure, fault, or error condition of the component by the diagnostic function.

4. The apparatus as set forth in claim 1 further comprising a power source for the tag separate and independent of a power source for the component.

5. The apparatus as set forth in claim 4 wherein the separate and independent power source is a battery.

6. The apparatus as set forth in claim 1 further comprising a clock interfaced to the tag such that a time value is stored by the tag upon transition of the latch into a latched mode.

7. The apparatus as set forth in claim 1 further comprising a counter interfaced to the tag such that a count value is stored by the tag upon transition of the latch into a latched mode.

8. The apparatus as set forth in claim 1 wherein the tag is configured to store and transmit upon energization one or more codes selected from the group of a fault code, a time value, a counter value, and a component location value.

9. An automated method comprising:

providing a radio-frequency identification tag associated with a first electronic component of a computer system, the electronic component being installed on a common communications bus and power bus among at least one other electronic component wherein failure of a component may cause disruption of the power bus, the communications bus, or both power and communications busses;

receiving by a system-level diagnostic function a diagnostic failure indication from the first electronic component, the system-level diagnostic function being within the computer system but external to the first electronic component;

responsive to receipt of the diagnostic failure indication, send a latching signal from the component-external system-level diagnostic function to the first electronic component; and responsive to receiving the latching signal by the first electronic component; controlling a tag latch to operate in at least two stable modes including an unlatched mode which prevents the tag from transmitting signals upon query by a radio-frequency identification reader, and a latched mode which enables the tag to transmitting signals upon query by a radio-frequency identification reader.

10. The method as set forth in claim 9 wherein the unlatched mode of the latch is controlled as a default mode of operation.

11. The method as set forth in claim 9 wherein the latch is transitioned to the latched mode by the diagnostic function responsive to detection of a failure, fault, or error condition of the component by the diagnostic function.

12. The method as set forth in claim 9 further comprising a step of providing a power source for the tag separate and independent of a power source for the component.

13. The method as set forth in claim 12 wherein the step of providing a separate and independent power source comprises providing a battery.

14. The method as set forth in claim 9 further comprising a step of providing a clock interfaced to the tag such that a time value is stored by the tag upon transition of the latch into a latched mode.

15. The method as set forth in claim 9 further comprising a step of providing a counter interfaced to the tag such that a count value is stored by the tag upon transition of the latch into a latched mode.

16. The method as set forth in claim 9 further comprising a step of storing in the tag and transmitting upon energization of the tag one or more codes selected from the group of a fault code, a time value, a counter value, and a component location value.

* * * * *